(12) United States Patent
D'Ambrosio et al.

(10) Patent No.: US 8,799,080 B2
(45) Date of Patent: Aug. 5, 2014

(54) DYNAMIC WEBPAGE GENERATION INCLUDING REQUEST-TIME AUCTIONED WEB CONTENT

(75) Inventors: Bruce D. D'Ambrosio, Seattle, WA (US); Michael Wellman, Ann Arbor, MI (US)

(73) Assignee: DigitalScirocco, Inc., Seattle, WA (US)

( * ) Notice: Subject to any disclaimer, the term of this patent is extended or adjusted under 35 U.S.C. 154(b) by 557 days.

(21) Appl. No.: 12/819,038

(22) Filed: Jun. 18, 2010

(65) Prior Publication Data

US 2010/0324973 A1 Dec. 23, 2010

Related U.S. Application Data

(60) Provisional application No. 61/269,239, filed on Jun. 22, 2009.

(51) Int. Cl.
*G06Q 30/00* (2012.01)

(52) U.S. Cl.
USPC ............. 705/14.71; 705/26.3; 705/26.41

(58) Field of Classification Search
CPC .......... G06Q 30/0601; G06Q 30/0613; G06Q 30/0619; G06Q 30/0623–30/0629; G06Q 30/0641; G06Q 30/08; G06Q 30/0251; G06Q 30/0253–30/0256; G06Q 30/0273–30/0277
USPC ............... 705/14.4–14.73, 26.1–27.2, 51–59
See application file for complete search history.

(56) References Cited

U.S. PATENT DOCUMENTS

| | | |
|---|---|---|
| 4,903,201 A | 2/1990 | Wagner |
| 6,363,254 B1 | 3/2002 | Jones et al. |
| 6,952,682 B1 | 10/2005 | Wellman |
| 7,133,841 B1 | 11/2006 | Wurman et al. |
| 7,200,570 B1 | 4/2007 | Wu |
| 7,296,001 B1 | 11/2007 | Ephrati et al. |
| 7,558,752 B1 | 7/2009 | Ephrati et al. |
| 7,580,858 B2 | 8/2009 | Almeida |
| 7,822,636 B1 | 10/2010 | Ferber et al. |
| 7,962,363 B2 * | 6/2011 | Patel et al. ............ 705/14.4 |

(Continued)

FOREIGN PATENT DOCUMENTS

| | | |
|---|---|---|
| KR | 1020050063886 A | 6/2005 |
| KR | 1020080095429 A | 10/2008 |

OTHER PUBLICATIONS

"Tahoo! forms alliance with Overture". Business Editors/High-Tech Writers. Business Wire. New York. Nov. 13, 2001.*

(Continued)

*Primary Examiner* — William Allen
(74) *Attorney, Agent, or Firm* — Schwabe, Williamson & Wyatt, P.C.

(57) ABSTRACT

Embodiments include methods, apparatus, and systems associated with providing request-time auctioning of web content and web services. The auction may be performed by a request-time web content auctioning service, which may accept bids of content and/or services from content and/or service providers, and may auction these bids against offers of space on webpages in websites. The auction may, in various embodiments, be performed in real time, such as, for example, during generation of a webpage in response to a request to view a webpage from a visitor to the webpage. The auction service may, in various embodiments, also provide for the auctioning of web services for webpages, such as, for example, content filtering. Other embodiments may be described and claimed.

30 Claims, 8 Drawing Sheets

(56) References Cited

U.S. PATENT DOCUMENTS

| | | | |
|---|---|---|---|
| 2002/0065851 | A1 | 5/2002 | Watson et al. |
| 2004/0103024 | A1 | 5/2004 | Patel et al. |
| 2005/0131918 | A1 | 6/2005 | Hillis et al. |
| 2006/0085815 | A1 | 4/2006 | Nguyen-Tran |
| 2006/0212350 | A1* | 9/2006 | Ellis et al. ............... 705/14 |
| 2007/0061247 | A1 | 3/2007 | Ramer et al. |
| 2007/0150353 | A1 | 6/2007 | Krassner et al. |
| 2008/0167943 | A1 | 7/2008 | O'Neil et al. |
| 2009/0144141 | A1* | 6/2009 | Dominowska et al. ...... 705/14 |
| 2009/0157511 | A1 | 6/2009 | Spinnell et al. |
| 2009/0164317 | A1* | 6/2009 | Glazer ..................... 705/14 |
| 2010/0145809 | A1* | 6/2010 | Knapp et al. ............ 705/14.71 |
| 2010/0250332 | A1* | 9/2010 | Ghosh et al. ............ 705/10 |
| 2011/0054997 | A1* | 3/2011 | Feuerstein et al. ....... 705/14.42 |
| 2011/0066510 | A1* | 3/2011 | Talegon .................. 705/14.71 |
| 2011/0087551 | A1* | 4/2011 | Klopf et al. ............. 705/14.71 |
| 2011/0226851 | A1 | 9/2011 | Lapstun et al. |

OTHER PUBLICATIONS

Dyer, James S. & Sarin, Rakesh K. "Measurable Multiattribute Value Functions", Operations Research, vol. 27, No. 4 (Jul.-Aug. 1979), pp. 810-822.

Engel, Yagil & Wellman, Michael "CUI Networks: A Graphical Representation for Conditional Utility Independence", Journal of Artificial Intelligence Research 31 (2008) 83-112.

Engel, Yagil, Wellman, Michael, & Lochner, Kevin "Bid Expressiveness and Clearing Algorithms in Multiattribute Double Auctions", Seventh ACM Conference on Electronic Commerce, pp. 110-119, 2006.

Fishburn, Peter C. "Interdependence and Additivity in Multivariate, Unidimensional Expected Utility Theory", International Economic Review, vol. 8, No. 3 (Oct. 1967), pp. 335-342.

Keeney, Ralph L. & Raiffa, Howard "Decisional with Multiple Objectives: Preferences and Value Tradeoffs", John Wiley & Sonas, pp. 100-117, 1976.

Parkes, David C. & Kalagnanam, Jayant "Models for Iterative Multiattribute Procurement Auctions", Management Science, vol. 51, No. 3, Mar. 2005, pp. 435-451.

International Search Report and Written Opinion for Application PCT/US2010/039384, mailed on Feb. 7, 2011.

Guth et al. "Selling Web Advertising Like Pork Bellies," Wall Street Journal, vol. 249, No. 124, p, B1, May 29, 2007.

"Yahoo! forms alliance with Oventure". Business Editors/High-Tech Writers, Business Wire. New York, Nov. 13, 2011.

* cited by examiner

DYNAMIC WEBPAGE GENERATION INCLUDING REQUEST-TIME AUCTIONED WEB CONTENT

RELATED APPLICATIONS

This application claims the benefit of U.S. Provisional Application No. 61/269,239, filed Jun. 22, 2009. The present application is also related to U.S. patent application, Ser. No. 12/819,044, entitled "Multi-Attribute Auctions," contemporaneously filed.

TECHNICAL FIELD

The present application relates generally to the Internet and Web content, and more particularly to dynamic generation of webpages, including request-time auctioned web content.

BACKGROUND

Web site providers are increasingly overwhelmed by an ever-expanding choice of internally- and externally-sourced content for their webpages. Placement and integration of these data can be clumsy and labor-intensive. The burden of discovery, placement, and integration of choices typically falls on the webpage provider, who often has limited expertise, understanding of site-visitor interests, and/or resources for this labor-intensive task. Additionally, current paradigms place these decisions at site-design time, when information about specific webpage visitors is lacking.

Meanwhile, web content and service providers continue to build a wide array of outsourceable content and service. Examples include editorial content, advertising, text, graphics, metrics, recommendations, location services, widgets, mashups, RSS feeds, and/or real-time streams. These content and service providers in turn are often frustrated by their limited ability to make their goods and services known to the website providers, as well as face difficulty in pricing and marketing these goods and services.

Further, website visitors increasingly demand that websites respond to their particular interests, both as individuals and as members of communities.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through the use of the accompanying drawings, in which:

SUMMARY

Figure 1:
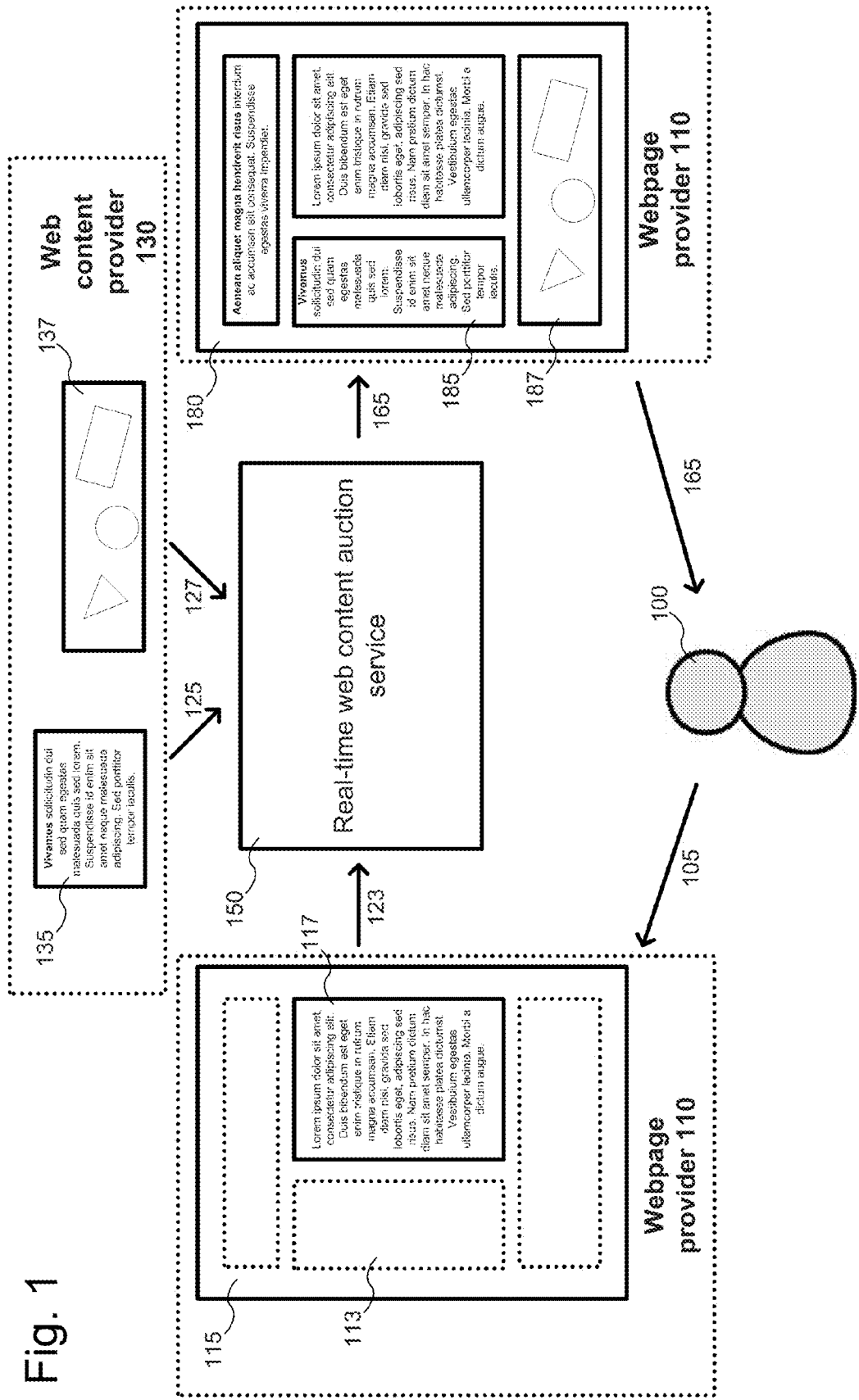
FIG. 1 illustrates a block diagram showing example usage and information flow of a request-time web content auction service in accordance with various embodiments.

Described embodiments include methods, apparatus, and systems which may provide for request-time auctioning of web content and web services. In various embodiments, the auction is performed by a request-time web content auctioning service, which accepts bids of content and/or services from content and/or service providers, and matches these bids against offers of space on webpages in websites. The auction may, in various embodiments, be performed in real time, such as, for example, during generation of a webpage in response to a request to view a webpage from a visitor to the webpage. For example, in response to a webpage request, different aspects of the system or entities working with the system may: make offers of space on a webpage to the auctioning system, match the offers with web content bids, generate the webpage to include content which matches the bids, and send the newly generated webpage to the visitor who requested it. The auction service may, in various embodiments, also provide for the auctioning of web services for webpages, such as, for example, content filtering.

In various embodiments, the use of the request-time web content auctioning systems and techniques described herein may provide for one or more of the following aspects:

1) A uniform mechanism for discovery, pricing, selecting, and integrating content and services into webpages;
2) A marketplace and settlement service for acquiring content and services for websites;
3) The use of automated electronic auctions for acquiring content and services for webpages;
4) The use of automated electronic auctions for price discovery for web content and services;
5) The use of automated electronic auctions for context-specific price discovery for web content and services;
6) The use of automated context (visitor and site) models for evaluation of web content and services.

In one example, a computer-implemented method for generating a webpage may be described. The method may comprise receiving in real time from an auction service, by a computing device, one or more pieces of content, links to the content or identities of the content, that are authorized to be included in offered space on a webpage. The one or more pieces of content, or links to the content or identities of the content, may be provided by the auction service as a result of a content auction conducted in real time in response to a dissemination of one or more offers of space on the webpage to contain content, wherein the dissemination is made in real time in response to a request for the webpage. The method may also comprise generating, by the computing device, the webpage containing some or all of the one or more authorized pieces of content for response to the request for the webpage.

In another example, a method for facilitating generation of a webpage may be described. The method may comprise receiving, at a computing device, one or more bids respectively associated with one or more pieces of content to place the one or more pieces of content onto one or more webpages having space for bid for placement of content; receiving, in real time at the computing device, an offer of space on a webpage, the webpage provided in real time in response to a request for the webpage; matching in real time, at the computing device, the offer to determine a winning piece of content for the webpage; and authorizing in real time, at the computing device, the winning piece of content for one or more instances of inclusion in the to be generated webpage.

DETAILED DESCRIPTION OF EMBODIMENTS

In the following detailed description, reference is made to the accompanying drawings which form a part hereof, and in which are shown by way of illustration embodiments which may be practiced. It is to be understood that other embodiments may be utilized and structural or logical changes may be made without departing from the scope of the disclosure. Therefore, the following detailed description is not to be taken in a limiting sense, and the scope of embodiments is defined by the appended claims and their equivalents.

The disclosure is drawn, inter alia, to methods, apparatus, systems, and computer readable media related to request-time auctions of web content and services, including matching of multi-attribute bids and offers. In the description to follow, the term "bid" is often used for bids that a content provider submits, while "offers" are often used in association with web site providers, such as for the offer of space or the offer for service. The employment of the separate terms is for the purposes of clearer description of from whom the actions described herein initiate. The employment of the separate terms should not be read to imply that an offer from a website provider may not take a form similar to a bid or vice versa. The present disclosure anticipates that in various embodiments, offers may take the form of a bid, and the context clearly indicates otherwise, the term should be so expansively construed.

In various embodiments, techniques and systems described herein may be used in scenarios outside of browser views of webpages. Various embodiments include content rendered by applications that use hypertext transfer protocol or other web-based protocols other than web browsers. Further, various embodiments may provide for auctions utilizing other forms of online composite content, such as, for example, email or text-based content. Additionally, in various embodiments, non-web-based networking protocols may be used. While descriptions provided herein are made with reference to "webpages," it should be recognized that such usage is made for the sake of bevity and simple description and should not be read to imply technical limitations on embodiments.

FIG. 1 illustrates a block diagram of example usage and information flows in a request-time web content auction service in accordance with various embodiments. While the example illustration shows particular orders of events and flow of information, in various embodiments, various processes may be performed in alternative orders or may be omitted entirely. As illustrated, FIG. 1 shows interactions between computing devices associated with a user 100, a webpage provider 110, a web content provider 130, and a request-time web content auction service 150 (hereinafter, simply between a user 100, a webpage provider 110, a web content provider 130, and a request-time web content auction service 150, however, the description and the claims should be read with all interactions between user and providers via computing devices). The computing devices may be coupled with each other via local and/or wide area, wired and/or wireless, private and/or public networks. An example of a public network may be the Internet.

In the illustration of FIG. 1, the webpage provider 110 and web content provider 130 are illustrated as dotted lines showing domain over various webpages (such as webpages 115 and 180) or web content (such as content 135 and 137); in various embodiments, the webpage provider 110 and web content provider 130 may comprise additional components which are not illustrated for the sake of expedited discussion. In the illustration of FIG. 1, a user 100 may send a request 105 to a webpage provider 110 to see a webpage, such as webpage 115. At the time of the request, as illustrated in FIG. 1, the webpage may have one or more spaces in it which are not yet completed, such as space 113, as well as completed portions, such as space 117. For example, over a given period of time a webpage provider may serve up a consistent piece or pieces of editorial content to multiple visitors to webpage 115 and may therefore choose to pre-populate a space with that content, such as in space 117. However, the provider may also choose to populate one or more spaces at the time of request of the webpage, and may therefore maintain incomplete portions, such as in space 113.

After receiving the request 105, the webpage provider 110 may then send an offer 123 of one or more pieces of webpage space to the request-time web content auction service 150. In various embodiments, the web content provider 130 may also send bids to place content, such as, for example, bid 125 for text-based content 135 and/or bid 127 for graphical content 137 to the request-time web content auction service 150. In various embodiments, the request-time web content auction service 150 may receive content from more than one web content provider. In various embodiments, the bids received from web content providers may be received contemporaneously with or as a result of one or more offers from webpage providers; in alternate embodiments, the bids may be received before or after the receipt of the offers. In various embodiments, the request-time web content auction service 150 may receive bids for services in addition to or in lieu of bids for placement of web content. A web service provider (not illustrated) may submit bids to provide services such as, for example, content filtering or context modeling. Although the description of auction operations as described herein may be done, for the most part, with reference to bids for placement of web content, similar techniques may be used for auctioning and provision of web services.

After receiving bids and offers, the request-time web content auction service 150 may provide to the webpage provider 110 one or more indications of winning content 165. Such indications may include, in various embodiments, the content itself, an encoded version of the content, a link to the content, and/or a unique identifier which can be used to obtain the winning content. Using this winning content, the webpage provider 110 may then generate a completed webpage 180, such as by including the winning content in the previously-unfilled spaces, such as spaces 185 and 187, which for illustrative purposes contain the content illustrated as content 135 and 137, respectively. In various embodiments, the content which is included in the completed webpage may be included in an identical fashion to the content provided by the web content provided (such as, for example, content 137 in space 187) or may be modified, such as for space or content restrictions (such as for example, content 135 in space 185). After the completed webpage is generated, the webpage may be provided by the webpage provider 110 to the user 100, such as by serving 165 the webpage.

Figure 2:
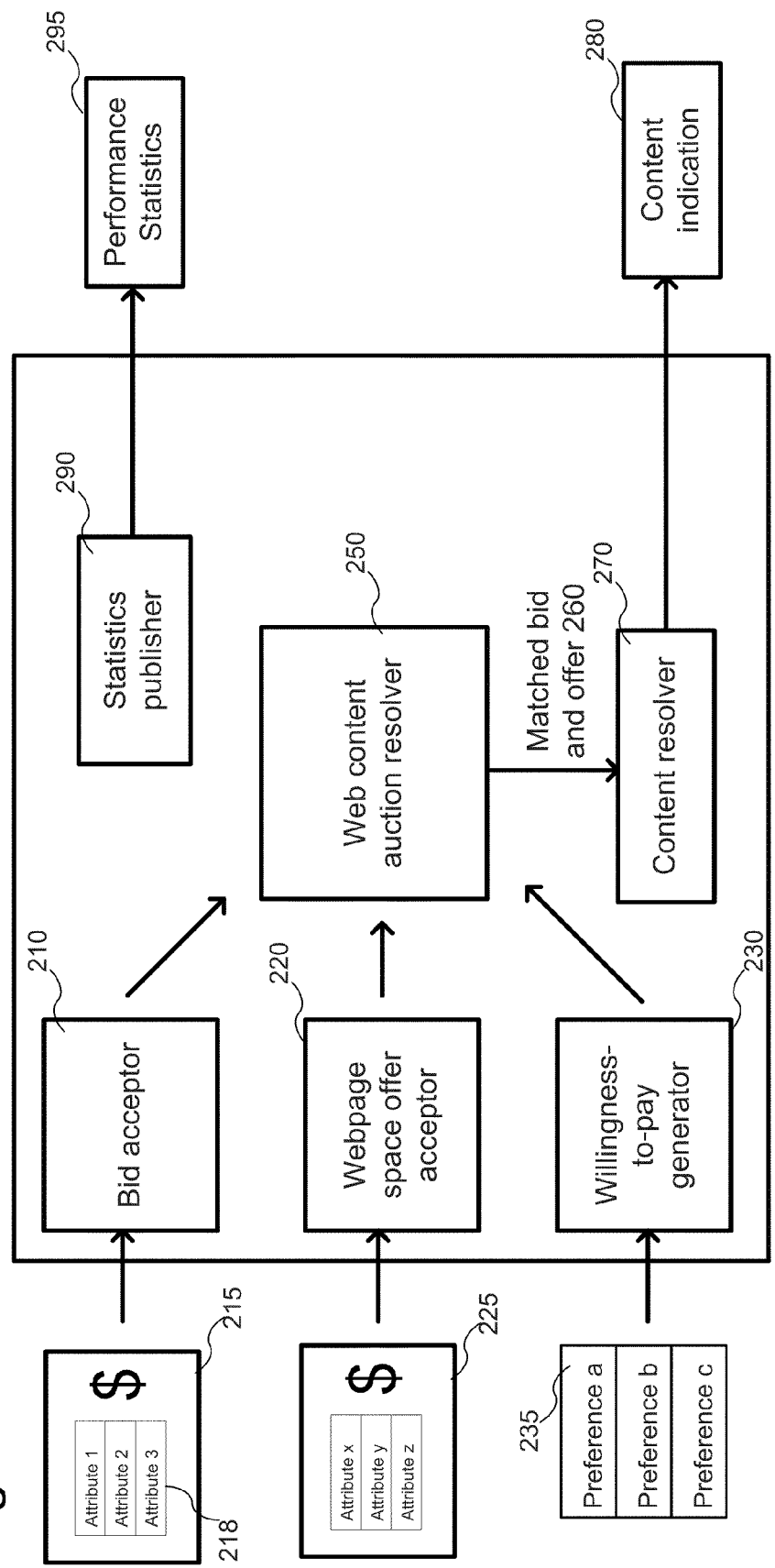
FIG. 2 illustrates a block diagram of various components and information flows utilized in various embodiments of the request-time content auction service in accordance with various embodiments.

FIG. 2 illustrates a block diagram of various components and information flows utilized in various embodiments of the request-time content auction service 150 in accordance with various embodiments. The request-time content auction service 150, as illustrated, comprises a bid acceptor component 210, which may be configured to accept bids, such as for web content or web services, illustrated in FIG. 2 by bid 215. Bids may include a monetary amount, illustrated by the $ symbol. In various scenarios, a web content provider may include a price to buy in a bid, such as when the web content provider is willing to pay money to have its content included in a webpage, or a price to sell in a bid, indicating that the web content provider wishes to be paid by the webpage provider for inclusion of the bidded-for content. In alternative scenarios, the bid 218 may have a zero-valued price in the bid. In various embodiments, the bid may be received by the bid acceptor in real time during a webpage request, or may be accepted ahead of time, before a request has been received.

The bid 215 may also contain one or more attributes, such as illustrated attribute list 218. In various embodiments, these attribute lists may be used by the request-time content auction service 150 to determine the web content provider's willingness to pay (or willingness to accept) a particular monetary value for use of its content. This willingness-to-pay value may be used to match content bids to space offers during auctions facilitated by the request-time content auction service 150.

The request-time content auction service 150 may also comprise a webpage space offer acceptor 220, which may be configured to accept offers of webpage space from one or more webpage providers, such as offer 225. The webpage space offer acceptor 220 may also be configured to accept offers which comprise a price (which may be a price to buy or a price to sell) and/or one or more non-price attributes. In various embodiments, offers of webpage space may also include constraints, such as on content relevance or suitability, which may prevent inappropriate content offers from consideration during operation of auctions. In various embodiments, offers may be received by the webpage space offer acceptor in real time during a webpage request, or may be accepted ahead of time, before a request has been received.

In various embodiments, attributes may include signifiers of content, keywords, content length, keywords, website domain, context, constraints, content focus or restrictions, visitor information, and/or performance metrics based on past experience or predictive models. In some embodiments, attributes may include non-local attributes, such as downstream events. In some embodiments, attributes may include attention attributes, such as mouse hover, session-length measures, and defined-event measures, such as whether a check-out has occurred or will occur. The non-price attributes may also include predictions of performance as described below, such as, for example, predictions of click-through rates or attention paid. Examples of webpage-specific attributes may include domain of discourse of a website, page and/or specific page area(s) being offered, the size of the area(s), and a willingness-to-pay function for the webpage provider (discussed in greater detail below). Examples of web content provider information may include bidder identity as well as domain of discourse, presentation information (e.g., space needed and/or media), and non-monetary cost (e.g., bandwidth) of offered content.

Attributes may also be determined by discovery. Discovery may be performed on item attributes (e.g., explicit markup, unstructured text, visitor attention measures), in-site and off-site relational information (e.g., visitor co-reference information, web-available "links to-from" statistics) information, and/or on existing publically available ontologies (both formal and informal, such as a set of Wikipedia page titles).

Attributes for content may also comprise non-topic attributes including timeliness (recentness of creation), medium, format, placement, size, and/or bandwidth requirements.

As mentioned above, visitor information may also be included as attributes in offers and bids. For example, a webpage provider in the financial information domain may indicate that its visitors to one webpage prefer analyst reports, blog feeds, and other non-quantitative content, whereas at another webpage the visitor community might prefer charts, tables, and other quantitative financial market information. Examples of visitor information which may be used for auction matching include location, connectivity, referring URL, session cookie, and visitor feedback/interaction and/or history.

The request-time content auction service 150 may also comprise a willingness-to-pay generator 230. In various embodiments, the willingness-to-pay generator 230 may accept one or more lists of ordered preferences, such as list 235, and generate a willingness-to-pay function. The ordered preferences may, in various embodiments, comprise types of attributes such as those discussed above. Further details of examples of willingness-to-pay functions are described below, but in various embodiments the willingness-to-pay functions are used to evaluate and generate quantitative values based on the preferences of a market participant (such as a webpage provider or a web content provider). In alternative embodiments, the willingness-to pay functions may be generated by the web content providers and/or the webpage providers and be included in a bid or offer, such as in bid 215 or offer 225. In these embodiments, the willingness-to-pay generator may not be included in the real-time web content auction service 150 but implementations of the generator may be used by either the web content provider or the webpage provider.

The request-time content auction service 150 may comprise a web content auction resolver 250, which in various embodiments, may take accepted bids, offers, and willingness-to-pay functions from the previously discussed components and generate one or more matched bid and offer pairs, such as the illustrated matched bid and offer 260. In various embodiments, this matched bid and offer may then be provided to a content resolver 270, which may identify which piece of web content should be included in the webpage of a webpage provider. The content resolver 270 may then provide a content indication 280, such as to the webpage provider, allowing the provider to complete the webpage and serve it to a requesting visitor.

In various embodiments, request-time content auction service 150 may also comprise a statistics publisher 290 which may collect (not shown) statistics relating to performance of various agents, including market participants. For example, the statistics publisher may record statistics relating to click-through conversions on a webpage, or length of attention shown to content provided from particular content providers. The statistics publisher 290 may then publish performance statistics 295, possibly to selected recipients, which allow recipients of the reported statistics to see past performance of market participants. This performance information may be utilized for making bids and offers based on predicted future performance, as described below.

Figure 3:
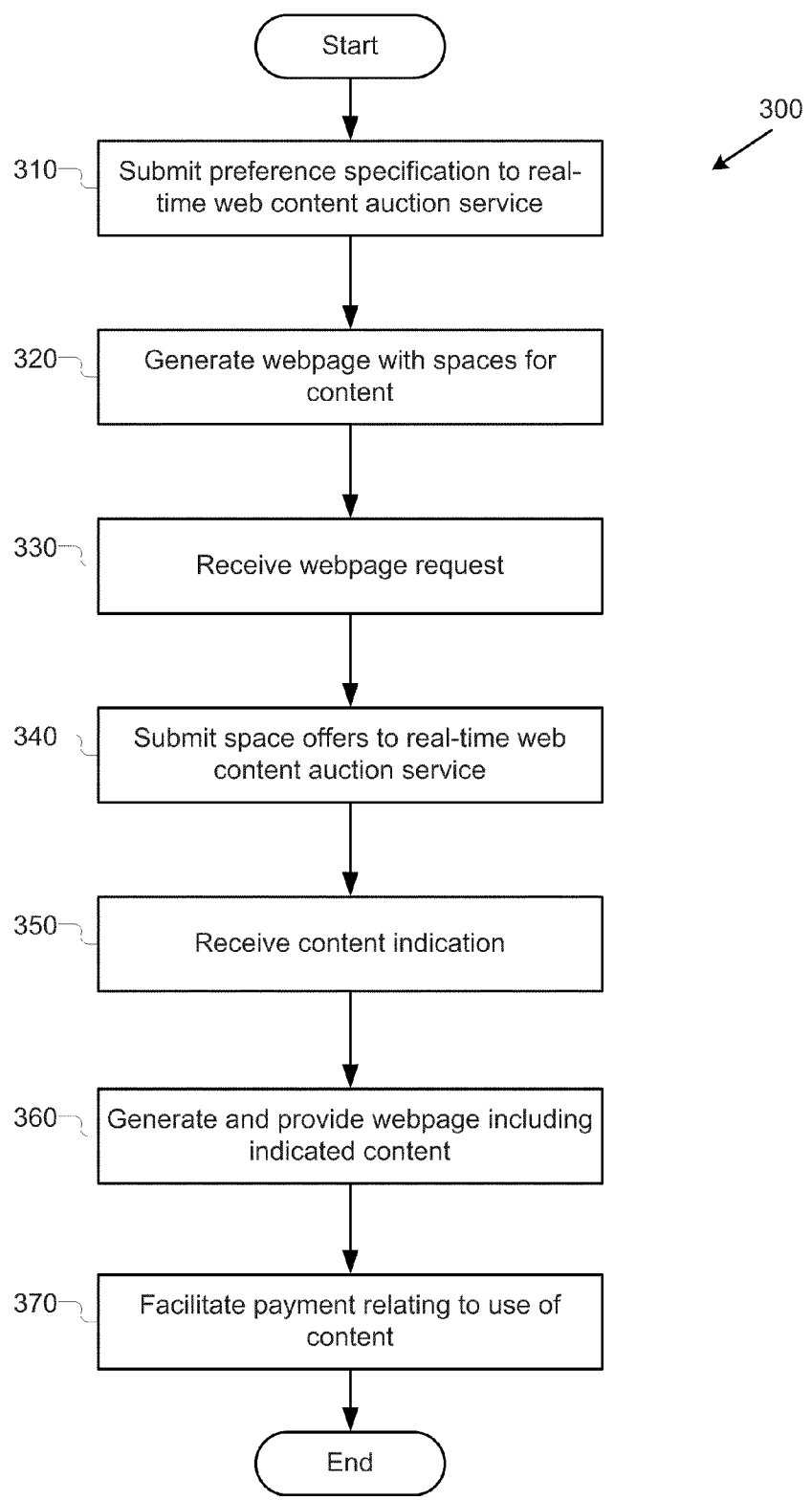
FIG. 3 illustrates a process for generating a webpage using request-time auctioned web content in accordance with various embodiments.

FIG. 3 illustrates an example process 300 for generating a webpage using request-time auctioned web content in accordance with various embodiments. Process 300 may be performed, in various embodiments, by a webpage provider, such as webpage provider 110. In various embodiments, the operations of process 300 may be performed in an order other than the order illustrated. Further, one or operations may be performed concurrently. The process may start at operation 310, where the webpage provider may submit a preference specification, such as, for example, a list of ordered preferences, to the request-time web content auction service 150. As discussed herein, this preference specification may be used by the request-time web content auction service 150 to generate a willingness-to-pay function for the webpage provider. At operation 320, which the webpage provider may generate a webpage with spaces for content. As discussed above, in various embodiments, these spaces may be for editorial content, advertising, or other types of content. Operation 320 may be performed before, after, or concurrently with operation 310 in various embodiments. At operation 330, the webpage provider may receive a webpage request, such as from a visitor to a website operated by the webpage provider. Though the illustrated operations show the generation of the webpage with spaces 320 as occurring before receiving a request for the webpage, in alternative embodiments, operation 320 may be performed after receiving the webpage request.

At operation 340, the webpage provider 110 may submit space offers to the request-time web content auction service 150. As discussed above, in various embodiments, these offers may comprise price information as well as non-price attributes. At operation 350, the webpage provider may receive an indication of one or more pieces of content which are to be included in its completed webpage from the request-time web content auction service 150. As discussed above, in various embodiments, these indications may include the content itself, a modified version of the content, a location where the content may be obtained, and/or other indications. At operation 360, the webpage provider may generate the completed webpage, including the indicated content and provides it to the requestor. At operation 370, the webpage provider may facilitate payment relating to the use of the content. In various embodiments, this facilitation may include paying a web content provider and/or receiving payment from a web content provider, directly or indirectly, e.g., via request-time web content auction service 150. In some embodiments, facilitating payment may be aggregated over many transactions. Thus, one payment covering multiple transactions may be made. In various such embodiments, the real time web content auction service may include a logging or accounting facility to record the various transactions before payment The process may then end.

Figure 4:
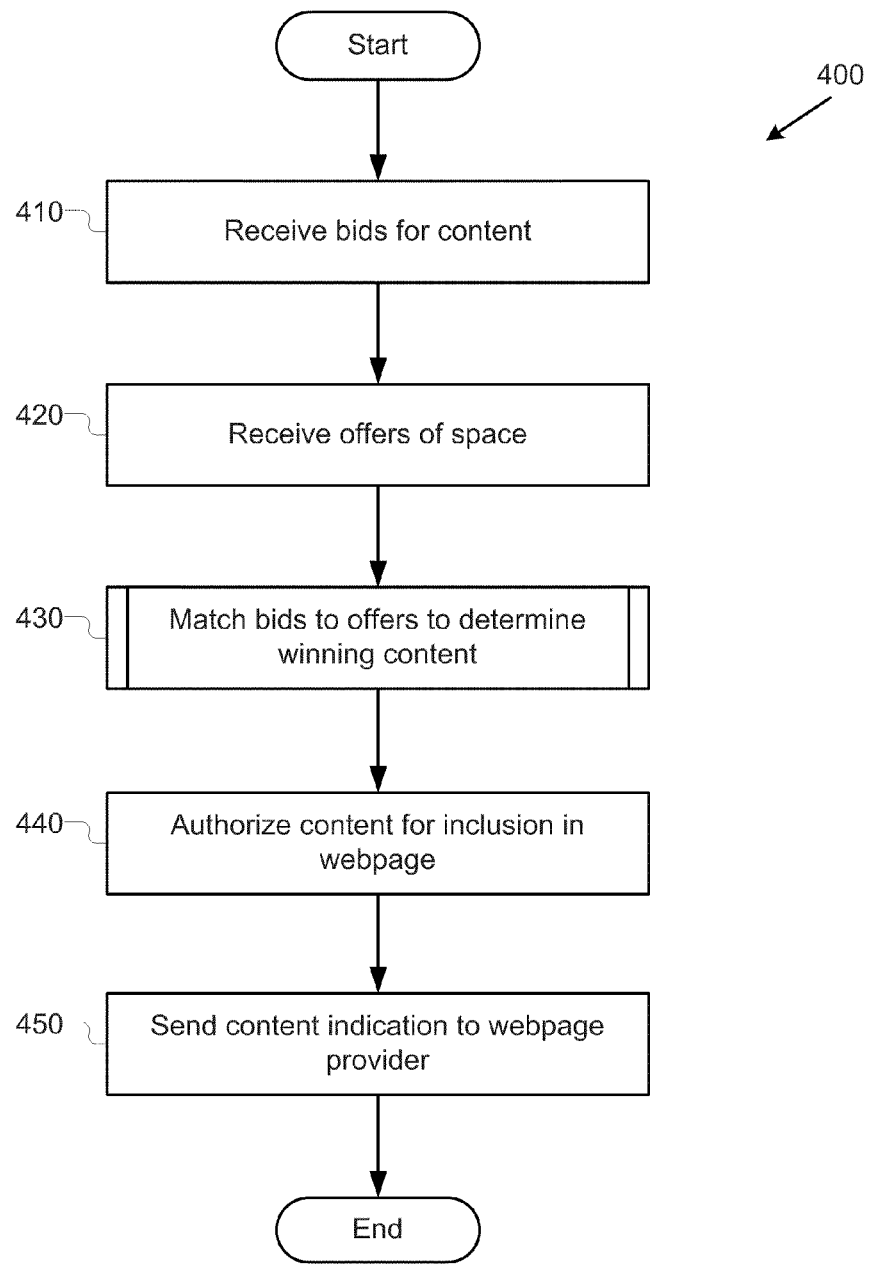
FIG. 4 illustrates a process for performing a request-time auction of web content in accordance with various embodiments.

FIG. 4 illustrates an example process 400 for performing a request-time auction of web content in accordance with various embodiments. Process 400 may be performed, in various embodiments, by the request-time web content auction service 150. The process may begin at operation 410, where the request-time web content auction service 150 may receive bids for web content, such as by bid acceptor 210, in response to, or before receipt of a request for web content. At operation 420, the request-time web content auction service 150 may receive offers of space on webpages, such as by webpage space offer acceptor 220, made in response to requests for the webpages. At operation 430, the request-time web content auction service 150 may match bids to the request-time offers to determine winning content. Particular examples of this matching are described below. At operation 440, the request-time web content auction service 150 may authorize the winning content for inclusion in a webpage. In various embodiments, this may include sending a notification to the web content provider that its content will be included in the matched webpage. At operation 450 the request-time web content auction service 150 may send an indication of the winning web content to the webpage provider, such as described above. The process may then end.

Figure 5:
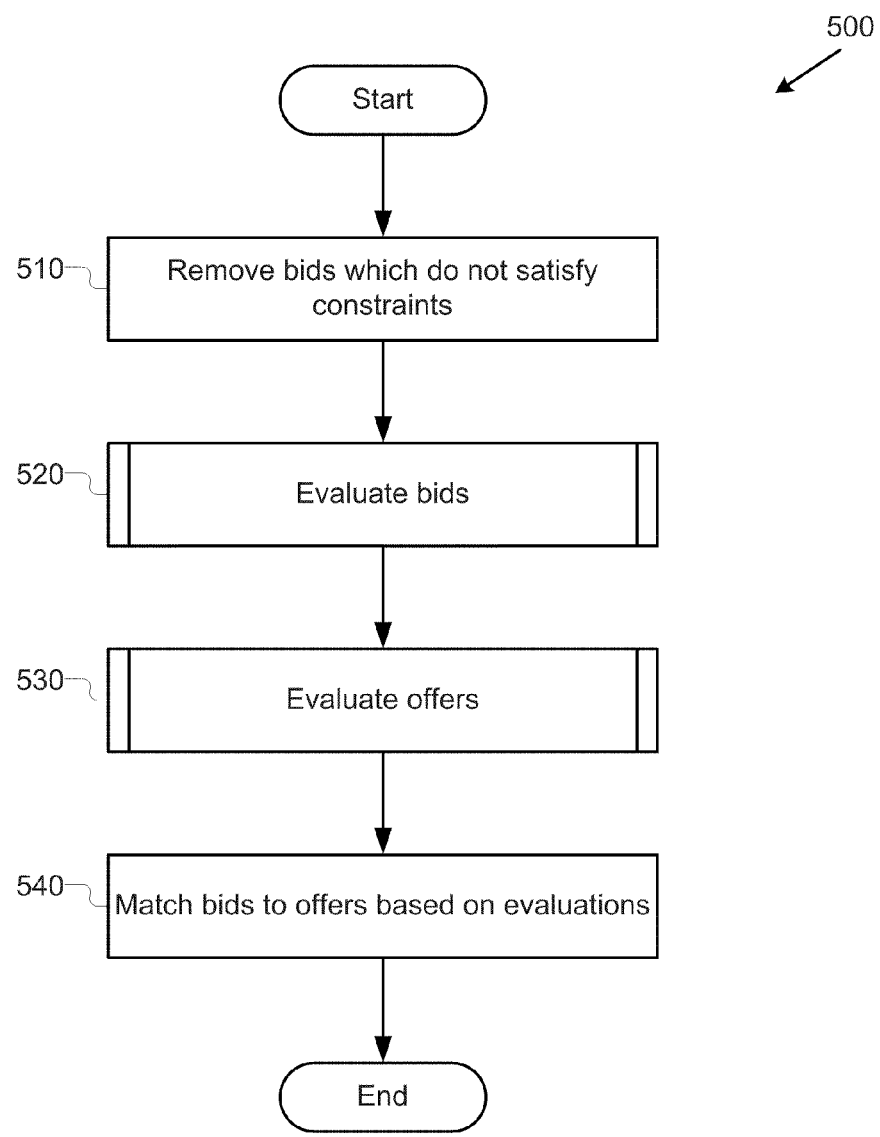
FIG. 5 illustrates a process for matching web content bids to request-time webpage space offers in accordance with various embodiments.

FIG. 5 illustrates an example process 500 for matching web content bids to request-time webpage space offers in accordance with various embodiments, such as by the web content auction resolver 250. In various embodiments, the process of FIG. 5 may be used to perform the bid and offer matching operation 430 of FIG. 4. The process may begin at operation 510, where the web content auction resolver 250 may remove bids which do not satisfy constraints which are identified in the webpage offers from evaluation. For example, if a bid is for content which is inappropriate to a particular webpage, the process may exclude that bid from further evaluation, at least with respect to that webpage offer. At operation 520, bids may be evaluated. In various embodiments, the bid evaluation process may include evaluation of one or more non-price attributes. At operation 530, request-time offers of webpage space may be evaluated. In various embodiments, the request-time offer evaluation process may also include evaluation of one or more non-price attributes. Particular examples of the evaluation processes of operations 510 and 520 are discussed below. At operation 540, the web content auction resolver 250 may then match bids to offers based on the results of the evaluations. In one embodiment, this matching may be performed by taking willingness-to-pay evaluations and comparing numbers for matches. In some embodiments, if a willingness-to-pay amount is greater than or equal to willingness-to-accept amount, then the bid may be matched to the offer. The process may then end.

Figure 6:
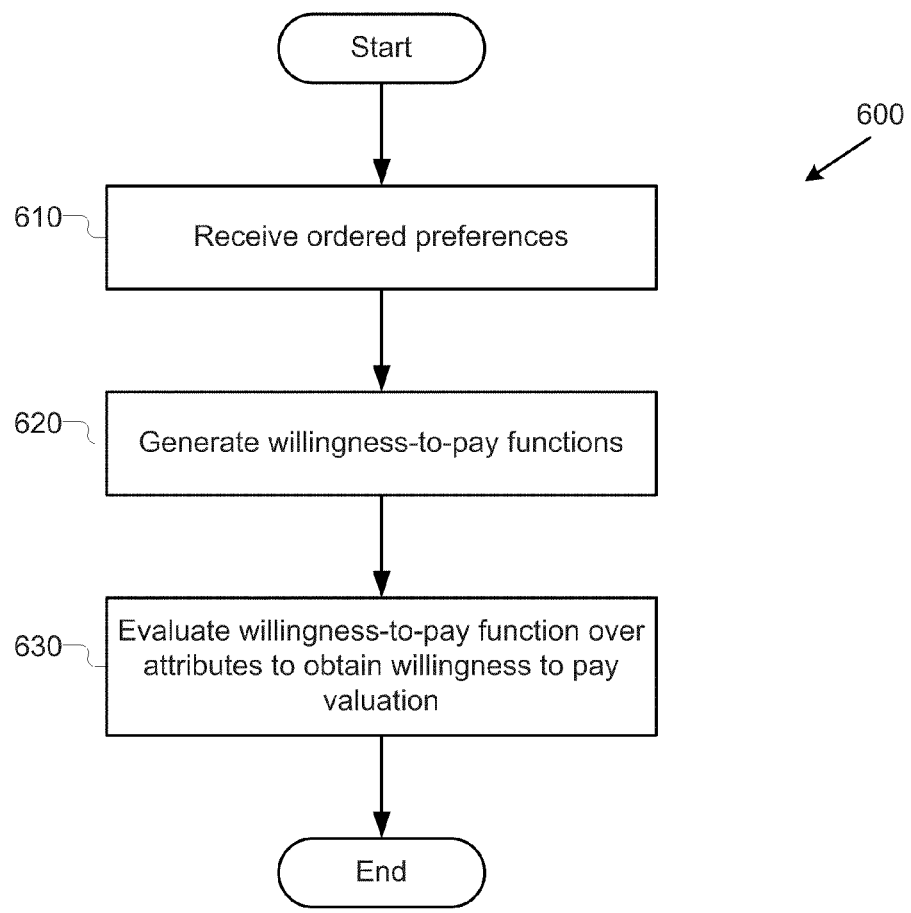
FIG. 6 illustrates a process for evaluating bids and/or request-time offers in accordance with various embodiments.

FIG. 6 illustrates an example process 600 for evaluating bids and/or request-time offers in accordance with various embodiments. In various embodiments, the process of FIG. 6 may be used to perform the bid and request-time offer matching operation 530 of FIG. 5. The process may begin at operation 610, where the willingness-to-pay generator 230 may receive ordered preferences. In various embodiments, the ordered preferences may be received from one or more web content providers, one or more webpage providers, or both. In various embodiments, the ordered preferences may be received prior to execution of a bid and request-time offer matching process, however, they are illustrated herein as part of the matching bid and request-time offer matching process for the sake of brevity.

At operation 620, the willingness-to-pay generator 230 may generate willingness-to-pay functions. In various embodiments, these willingness-to-pay functions may be based, at least in part, on previously-received ordered preferences. In various embodiments, generation of the willingness-to-pay functions may take advantage of the knowledge that a preference order over a set of attributes $A=(a_1, \ldots a_m)$ has an additive value function representation:

$$v(a_i, \ldots, a_m) = \sum_{i=1}^{m} v(a_i) \quad (1.1)$$

when the attributes A exhibit mutual preferential independence (MPI) [Keeney & Raiffa, 1976]. In various embodiments, such an additive form may be simpler than other forms, and may be employed in the multi-attribute auction techniques described herein. The assumption of MPI may be violated, however; in these cases embodiments may utilize more complex representations for value functions. Even in these situations, however, various embodiments may exploit other structural properties of value functions that reduce the complexity of bidding and other auction operations. In one example, a multi-attribute auction design based on generalized additive independence [Fishburn, 1967] may be used, which is more flexible than MPI while maintaining computational tractability in many cases. The use of both additive and generalized additive value functions for multiattribute auctions has been described. [Bichler 2001; Engel & Wellman, 2010; Parkes & Kalagnanam, 2005]. In addition, structural properties identified as useful for representing preferences, such as conditional utility independence [Engel & Wellman, 2008], could in a similar manner be exploited in a multiattribute auction mechanism.

Various embodiments of the willingness-to-pay function take advantage of the convenience, in market-based decision making, for example, of expressing value on a monetary scale. In some embodiments, this can be accomplished using measurable value functions (MVFs) [Dyer & Sarin, 1979]. Using MVFs, measurable value may be defined in terms of differences of willingness to pay for various outcomes. If it is assumed that an agent has a preference order over outcome space (represented, for example, by the preference orders discussed above), we can say this is represented by a set of attributes A, as well as an attribute p representing monetary consequence (also referred to as price information). It may also be assumed that preferences are quasi-linear in p, meaning that it is assumed that is there exists a value function of the form $v(A,p)=u(A)+L(p)$, where L is a positive linear function. This value function, which is in quasi-linear form, qualifies money as a measure of preference differences, and thus establishes a monetary scale for $u(A)$. $u(A)$ may then represent the aforementioned willingness-to-pay function. In various embodiments, the willingness-to-pay function may also be thought of as a seller's "willingness-to-accept" function.

In various embodiments, the willingness-to-pay function $u(A)$ may be interpreted as a cardinal function, unique up to a positive linear transformation. Elicitation of a willingness-to-pay function may be most intuitive when using direct monetary values. In this case, $L(p)=p$, which leads to $v(A,p)=u(A)+p$. The willingness-to-pay function u may then be constructed from preference information expressed on a monetary scale, using standard decision analysis or other preference elicitation techniques. In such embodiments, the willingness-to-pay function is an MVF over differences in reserve prices. Thus, the willingness-to-pay (accept) function may be a sufficient model of buyer (seller) preferences for purpose of bid evaluation, in particular when preferences are quasi-linear in p.

At operation 630, the generated willingness-to-pay functions may be evaluated by the web content auction resolver 250 over the bid attributes to obtain a willingness-to-pay valuation, such as the value of $u(A)$ described above. in various embodiments, by evaluating this willingness-to-pay function, the real-time web content auction service evaluates space of attribute configurations consistent with given attribute values and constraints and determines one configuration, plus a price, as an auction result. In some embodiments, this evaluation may comprise solving what a multiattribute matching problem (MMP) [Engel et al., 2006]. With this valuation obtained, the process then may end.

In various embodiments, various attributes may be taken into consideration when generating a willingness-to-pay function. For example, value calculations may take various forms.

In various embodiments, the generation may in part comprise valuation of direct consequences, such as, for a webpage provider: direct sales conversions, return visits, page views, or sub-page events such as hover or rollover events demonstrating increased visitor engagement. For content providers (who may be external to the webpage) these may include sub-page events within the provider's presentation, such as attention events such as hover or rollover, direct interaction events with the provider's presentation, or even downstream consequences of those interaction events (e.g., click-through events followed by further interaction with the destination).

In various embodiments, the generation may in part comprise valuation of indirect consequences as well. For example, interesting and relevant content, presented on a page, may increase visitor engagement and so increase monetized transaction rates on other areas of the page or subsequent page views.

In various embodiments, valuation may be assisted by a web content provider to target some average rate of return on use of a particular piece or pieces of content. In alternative embodiments, the request-time web content auction service 150 may publish data related to historical monetary and attention value derived from a web content offer in comparable contexts. This may be referred to as "value-in-context." In one embodiment, "time-distance decay" credit assignment mechanisms may be utilized to serve both agents in estimating bid and offer values.

Figure 7:
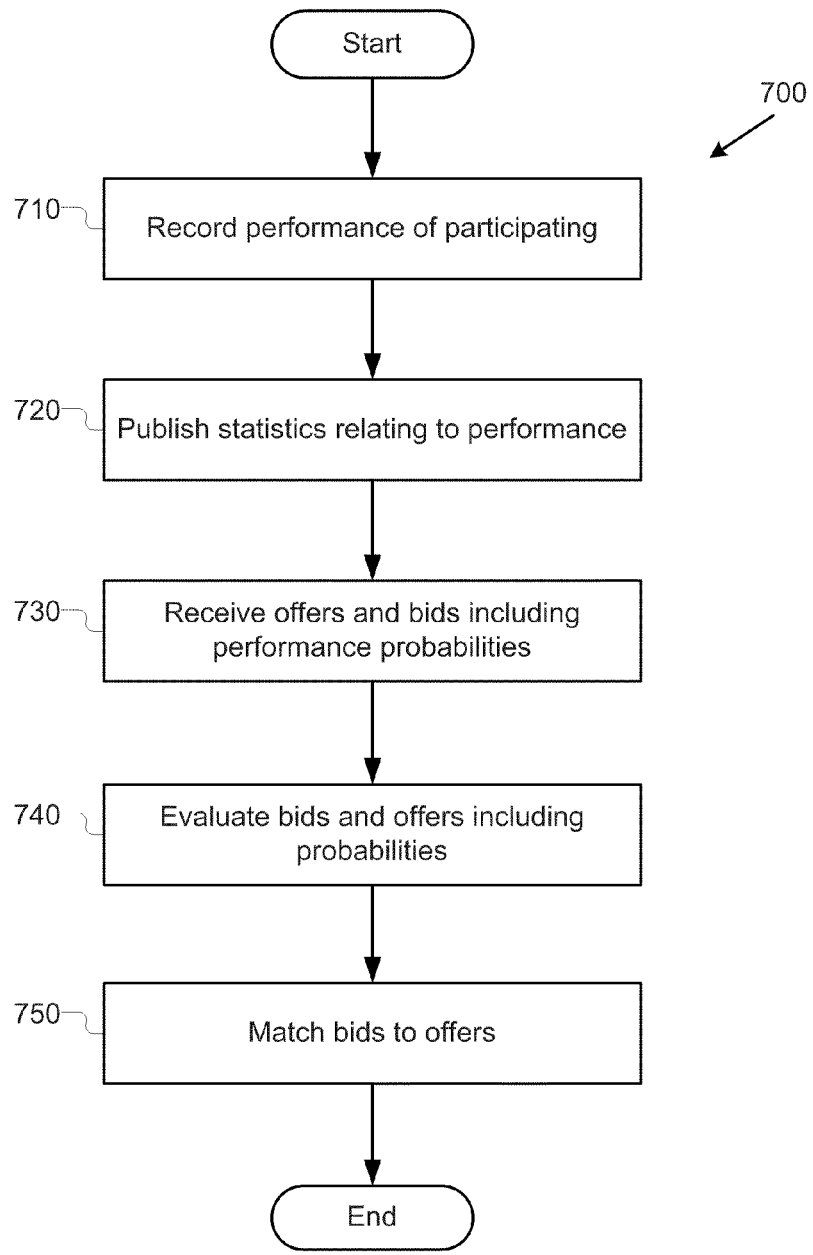
FIG. 7 illustrates a process for facilitating request-time auctions incorporating bid and offer probabilities in accordance with various embodiments.

FIG. 7 illustrates an example process 700 for facilitating request-time auctions incorporating bid and offer probabilities in accordance with various embodiments. The various embodiments, the request-time web content auction service 150 facilitates bids and offers relating to probabilities, given that some of natural preference attributes will refer to future events, and thus be unknown at auction time. In that case, the request-time web content auction service 150 may act as a trusted broker that may publish, and/or underwrite (possibly for a fee) market statistics about the impact (both monetary and non-monetary) of providers as a function of website and visitor context. Providers may then offer offers that include probability distributions over impacts, also referred to as "lotteries," where the probability distributions are drawn from published market statistics. In various embodiments, providers or the request-time web content auction service 150 can offer to underwrite these performance expectations. The underwriting may be paid for, in various embodiments, either as part of bid or transaction costs, or for a separate fee. This publication (and underwriting, if applicable) may allow web content providers and webpage providers to adjust their bidding strategies accordingly, rather than simply relying on guesses of possible performance. In various embodiments, the published statistics may be presented in the form of value-in-context data, such as described above. The value-in-context data may be estimated over various abstracts of webpage (or website), visitor, and content provider combinations.

In various embodiments, the operations performed at process 700 may be analogous to operations described above; some similar operations are elided for the sake of brevity. The process may begin at operation 710, where the request-time web content auction service 150 may record performance statistics of participating agents. For example, the request-time web content auction service 150 may record click-through rates or other rates for agents. In alternative embodiments, the performance statistics may be provided directly to the request-time web content auction service 150, such as by reports received from the webpage providers or web content providers. In various embodiments, performance statistics may be recorded at one or more levels of aggregation. At operation 720, the request-time web content auction service 150, such as at the statistics publisher 280, may publish statistics, such as performance statistics 290 relating to performance of one or more agents.

At block 730, the request-time web content auction service 150 may receive offers and bids which include performance probability distributions. These probabilities may also be known as "lotteries" and may be based in whole or in part on previously-published performance statistics. At operation 740 the request-time web content auction service 150 may then evaluate the bids and offers including these probability distributions, such as by using willingness-to-pay functions as described above. At 750, the request-time web content auction service 150 matches bids to offers, such as described above, and the process may then end.

Figure 8:
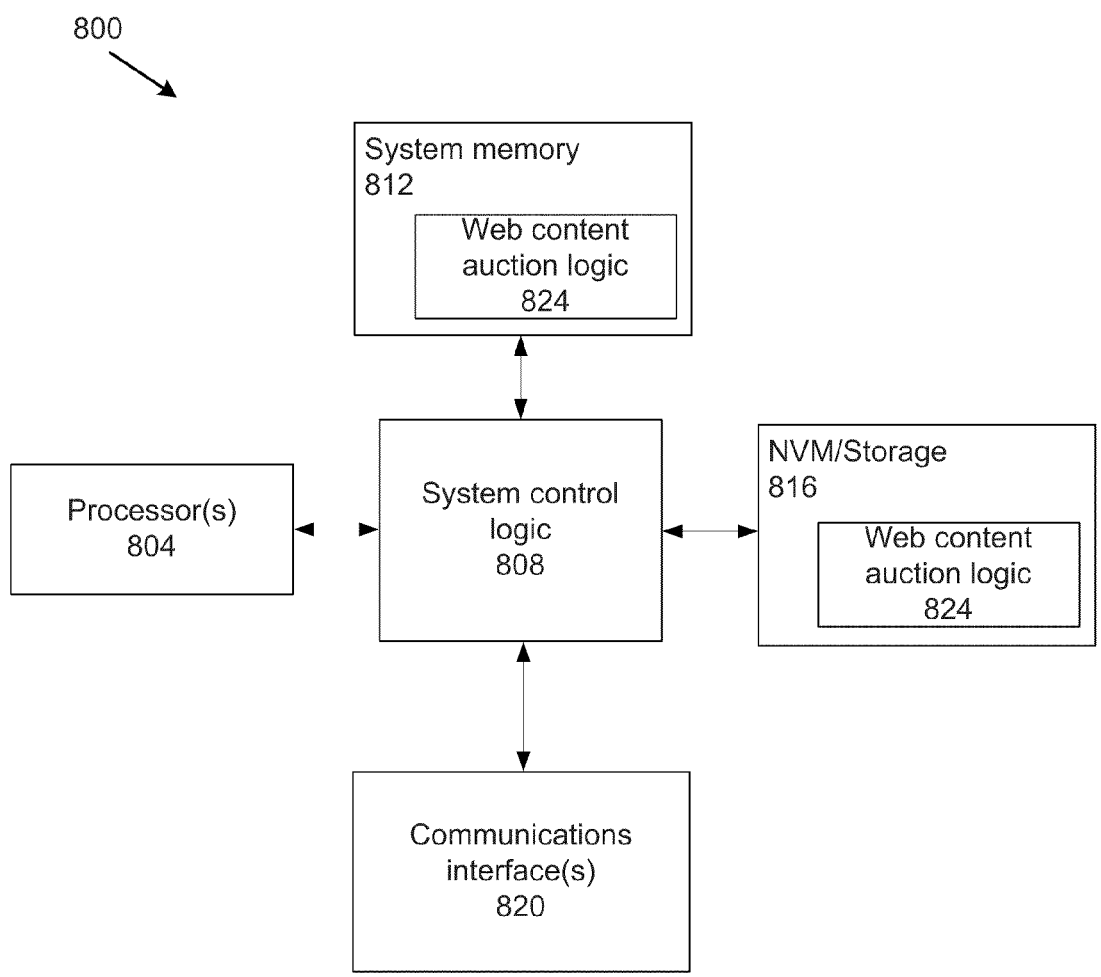
FIG. 8 illustrates an example computing environment configured to practice various aspects of the earlier described methods and systems.

The techniques and apparatuses described herein may be implemented into a system using suitable hardware and/or software to configure as desired. FIG. 8 illustrates, for one embodiment, an example system 800 comprising one or more processor(s) 804, system control logic 808 coupled to at least one of the processor(s) 804, system memory 812 coupled to system control logic 808, non-volatile memory (NVM)/storage 816 coupled to system control logic 808, and one or more communications interface(s) 820 coupled to system control logic 808.

System control logic 808 for one embodiment may include any suitable interface controllers to provide for any suitable interface to at least one of the processor(s) 804 and/or to any suitable device or component in communication with system control logic 808.

System control logic 808 for one embodiment may include one or more memory controller(s) to provide an interface to system memory 812. System memory 812 may be used to load and store data and/or instructions, for example, for system 800. System memory 812 for one embodiment may include any suitable volatile memory, such as suitable dynamic random access memory (DRAM), for example.

System control logic 808 for one embodiment may include one or more input/output (I/O) controller(s) to provide an interface to NVM/storage 816 and communications interface(s) 820.

NVM/storage 816 may be used to store data and/or instructions, for example. NVM/storage 816 may include any suitable non-volatile memory, such as flash memory, for example, and/or may include any suitable non-volatile storage device(s), such as one or more hard disk drive(s) (HDD(s)), one or more solid-state drive(s), one or more compact disc (CD) drive(s), and/or one or more digital versatile disc (DVD) drive(s) for example.

The NVM/storage 816 may include a storage resource physically part of a device on which the system 800 is installed or it may be accessible by, but not necessarily a part of, the device. For example, the NVM/storage 816 may be accessed over a network via the communications interface(s) 820.

System memory 812 and NVM/storage 816 may include, in particular, temporal and persistent copies of logic 824, respectively. Logic 824 may be configured to enable system 800, in response to operation of the logic, to practice some or all aspects of the dynamic webpage generation including request-time auctioned web content, and/or the request-time auction service methods described earlier. In various embodiments, logic 824 may be implemented via programming instructions of any one of a number of programming languages, including but not limited to C, C++, C#, HTML, XML, and so forth.

Communications interface(s) 820 may provide an interface for system 800 to communicate over one or more network(s) and/or with any other suitable device. Communications interface(s) 820 may include any suitable hardware and/or firmware. Communications interface(s) 820 for one embodiment may include, for example, a network adapter, a wireless network adapter, a telephone modem, and/or a wireless modem. For wireless communications, communications interface(s) 820 for one embodiment may use one or more antenna(s).

For one embodiment, at least one of the processor(s) 804 may be packaged together with logic for one or more controller(s) of system control logic 808. For one embodiment, at least one of the processor(s) 804 may be packaged together with logic for one or more controllers of system control logic 808 to form a System in Package (SiP). For one embodiment, at least one of the processor(s) 804 may be integrated on the same die with logic for one or more controller(s) of system control logic 808. For one embodiment, at least one of the processor(s) 804 may be integrated on the same die with logic for one or more controller(s) of system control logic 808 to form a System on Chip (SoC).

In various embodiments, system 800 may have more or fewer components, and/or different architectures.

The herein described subject matter sometimes illustrates different components or elements contained within, or connected with, different other components or elements. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Various aspects of the subject matter described herein are described using terms commonly employed by those skilled in the art to convey the substance of their work to others skilled in the art. However, it should be apparent to those skilled in the art that alternate implementations may be practiced with only some of the described aspects. For purposes of explanation, specific numbers, materials, and configurations are set forth in order to provide a thorough understanding of the illustrative examples. However, it should be apparent to one skilled in the art that alternate embodiments may be practiced without the specific details. In other instances, well-known features are omitted or simplified in order not to obscure the illustrative embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and e, etc." is used, in general such a construction is intended in the sense one having skill in the art would understand the convention (e.g., "a system having at least one of A, B, and C" would include but not be limited to systems that have A alone, B alone, C alone, A and B together, A and e together, Band e together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, Band C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Various operations may be described as multiple discrete operations in turn, in a manner that may be helpful in understanding embodiments; however, the order of description should not be construed to imply that these operations are order dependent. Also, embodiments may have fewer operations than described. A description of multiple discrete operations should not be construed to imply that all operations are necessary. Also, embodiments may have fewer operations than described. A description of multiple discrete operations should not be construed to imply that all operations are necessary.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the disclosure. Those with skill in the art will readily appreciate that embodiments of the disclosure may be implemented in a very wide variety of ways. This disclosure is intended to cover any adaptations or variations of the embodiments discussed herein. Therefore, it is manifestly intended that embodiments of the disclosure be limited only by the claims and the equivalents thereof.

What is claimed is:

1. A computer-implemented method for generating a webpage, comprising:
   receiving, by a computing device, a request for a webpage;
   determining, by the computing device, non-price information about the webpage or a website to which the requested webpage is associated, the non-price information describing a context for the request for the webpage;
   disseminating, by the computing device, one or more offers of space on the website to contain content to an auction service wherein the disseminating is done in real time in response to the request for the webpage and before sending the webpage in response to the request, and wherein the one or more offers of space comprise the determined non-price information;
   receiving in real time, from the auction service, by the computing device, one or more pieces of content, links to the content or identities of the content, that are authorized to be included in offered space on the webpage, wherein the one or more pieces of content, links to the content or identities of the content are provided by the auction service as a result of a content auction conducted in real time in response to the dissemination of one or more offers of space on the webpage; and
   generating, by the computing device, the webpage containing some or all of the one or more authorized pieces of content in response to the request for the webpage.

2. The method of claim 1, wherein receiving in real time from an auction service, by a computing device, one or more pieces of content comprises receiving advertising.

3. The method of claim 1, wherein receiving in real time from an auction service, by a computing device, one or more pieces of content comprises receiving editorial content.

4. The method of claim 1, wherein receiving the request for the webpage comprises receiving the request, by the computing device, from a visitor to a website to which the webpage is associated or linked.

5. The method of claim 1, wherein receiving one or more pieces of content or links to the content comprises receiving responsive bids for the offered space from an online content auction service.

6. The method of claim 1, further comprising receiving, by the computing device from the auction service, one or more links to services or identities of services to be performed for the webpage.

7. The method of claim 6, wherein generating the webpage comprises utilizing one or more services which are linked to or identified to provide services for the webpage.

8. The method of claim 6, wherein receiving from the auction service, one or more links to services or identities of services comprise receiving a content filtering service.

9. The method of claim 6, wherein receiving, by the computing device from the auction service, one or more links to services or identities of services comprise receiving a context-modeling service.

10. The method of claim 1, wherein the non-price information comprises current performance metrics associated with the requested webpage or a website to which the requested webpage is associated at the time of the request for the webpage.

11. The method of claim 1, wherein the non-price information comprises domain or content information associated with the requested webpage or a website to which the requested webpage is associated.

12. The method of claim 1, wherein non-price information comprises probability information about future content performance predictions associated with the requested webpage or a website to which the requested webpage is associated.

13. The method of claim 1, wherein non-price information comprises one or more constraints associated with the requested webpage or a website to which the requested webpage is associated.

14. The method of claim 1, further comprising, at the computing device, paying a monetary value for publishing the contained one or more pieces of content.

15. The method of claim 1, further comprising, at the computing device, receiving payment of a monetary value for publishing the contained one or more pieces of content.

16. The method of claim 1, wherein the non-price information comprises one or more measures of times taken on user activities on a website to which the webpage is associated preceding the request for the requested webpage.

17. The method of claim 1, wherein the non-price information comprises descriptions of events performed on a website to which the webpage is associated preceding the request for the webpage.

18. The method of claim 1, wherein the non-price information comprises performance metrics describing rates of user interaction activity associated with the webpage or a website to which the webpage is associated.

19. The method of claim 1, wherein the non-price information comprises domain or content information associated with the webpage or a website to which the webpage is associated.

20. The method of claim 1, wherein non-price information comprises probability information about future content performance predictions associated with the webpage or a website to which the webpage is associated.

21. An article of manufacture, comprising:
a non-transitory computer-readable storage medium; and
a plurality of computer-executable instructions stored on the tangible computer-readable medium, wherein the computer-executable instructions, in response to execution by an apparatus, cause the apparatus to perform operations for generating a webpage, the operations comprising:
receiving a request for a webpage;
determining, by the computing device, non-price information about the webpage or a website to which the requested webpage is associated, the non-price information describing a context for the request for the webpage;
disseminating one or more offers of space on the webpage to contain content to an auction site, wherein the disseminating is done in real time in response to the request for the webpage and before sending the webpage in response to the request, and wherein the one or more offers of space comprise the determined non-price information,
receiving, in real time from the auction site, one or more pieces of content, links to the content or identities of the content, that are authorized to be included in offered space on the webpage, wherein the one or more pieces of content, links to the content or identities of the content are provided by the auction service as a result of a content auction conducted in real time in response to the dissemination of one or more offers of space on the webpage; and
generating the webpage containing some or all of the one or more authorized pieces of web content in response to the request for the webpage.

22. The article of claim 21, wherein the operations further comprise receiving, from the auction service, one or more links to services or identities of services to be performed for the webpage.

23. The article of claim 22, wherein generating the webpage comprises utilizing the one or more services which are linked to or identified to provide services on the webpage.

24. The article of claim 21, wherein the operations further comprise facilitating payment of a monetary value for publishing the contained one or more pieces of content.

25. The article of claim 24 wherein facilitating payment of a monetary value comprises receiving a monetary value for publishing the contained one or more pieces of content.

26. The article of claim 21, wherein the non-price information comprises one or more measures of time of user activities on a website to which the webpage is associated preceding the request for the requested webpage.

27. The article of claim 21, wherein the non-price information comprises descriptions of events performed on a website to which the webpage is associated preceding the request for the webpage.

28. The article of claim 21, wherein the non-price information comprises performance metrics describing rates of user interaction activity associated with the webpage or a website to which the webpage is associated.

29. The article of claim 21, wherein the non-price information comprises domain or content information associated with the webpage or a website to which the webpage is associated.

30. The article of claim 21, wherein non-price information comprises probability information about future content performance predictions associated with the webpage or a website to which the webpage is associated.

* * * * *